US012807112B2

(12) United States Patent
Auguste et al.

(10) Patent No.: US 12,807,112 B2
(45) Date of Patent: Nov. 24, 2026

(54) DISC BRAKE INCORPORATING AN ELECTROMECHANICAL PARKING BRAKE

(71) Applicant: HITACHI ASTEMO FRANCE, Drancy (FR)

(72) Inventors: Antony Auguste, Villier sur Marne (FR); Philippe Bourlon, Dammartin en Goële (FR)

(73) Assignee: HITACHI ASTEMO FRANCE, Drancy (FR)

(*) Notice: Subject to any disclaimer, the term of this patent is extended or adjusted under 35 U.S.C. 154(b) by 401 days.

(21) Appl. No.: 18/570,476

(22) PCT Filed: Jun. 8, 2022

(86) PCT No.: PCT/FR2022/051089
§ 371 (c)(1),
(2) Date: Dec. 14, 2023

(87) PCT Pub. No.: WO2022/263747
PCT Pub. Date: Dec. 22, 2022

(65) Prior Publication Data

US 2024/0270223 A1 Aug. 15, 2024

(30) Foreign Application Priority Data

Jun. 15, 2021 (FR) ...................................... 2106325

(51) Int. Cl.
*B60T 13/58* (2006.01)
*B60T 13/74* (2006.01)
*F16D 55/226* (2006.01)
*F16D 65/00* (2006.01)
(Continued)

(52) U.S. Cl.
CPC .......... *B60T 13/588* (2013.01); *B60T 13/741* (2013.01); *F16D 55/226* (2013.01); (Continued)

(58) Field of Classification Search
CPC ............... F16D 55/226; F16D 55/2262; F16D 55/2265; F16D 65/0068; F16D 65/18; (Continued)

(56) References Cited

U.S. PATENT DOCUMENTS 3,318,421 A * 5/1967 De Hoff .................. F16D 55/28 188/106 F
3,342,291 A * 9/1967 Wood .................... F16D 55/224 188/106 R (Continued)

FOREIGN PATENT DOCUMENTS

FR 3024516 A1 2/2016

OTHER PUBLICATIONS

Search Report for International Application No. PCT/FR2022/051089 dated Sep. 8, 2022.

*Primary Examiner* — Thomas J Williams
(74) *Attorney, Agent, or Firm* — McDonald Hopkins LLC

(57) ABSTRACT

Disc brake comprising a carrier, at least a first brake pad mounted in a sliding manner in the carrier, the first brake pad comprising a pad support and a friction material, and a caliper comprising two hydraulically actuatable pistons. The disc brake comprises a third piston which can be actuated at least by an actuator configured to move the third piston axially, the third piston being arranged between the two pistons, and an interface device arranged between the third piston and the pad support, the interface device comprising a plate comprising two through-openings, each aligned with a hydraulically actuatable piston and traversed by the pistons, and the head of the other piston is intended to come into contact with the plate between the two openings.

12 Claims, 3 Drawing Sheets

(51) Int. Cl.
*F16D 65/18* (2006.01)
*F16D 121/04* (2012.01)
*F16D 121/18* (2012.01)

(52) U.S. Cl.
CPC ....... *F16D 65/0068* (2013.01); *F16D 65/183* (2013.01); *F16D 2121/04* (2013.01); *F16D 2121/18* (2013.01)

(58) Field of Classification Search
CPC ............... F16D 65/183; F16D 2121/04; F16D 2121/18; B60T 13/588; B60T 13/741
USPC .......................................................... 188/72.6
See application file for complete search history.

(56) References Cited

U.S. PATENT DOCUMENTS 3,498,421 A * 3/1970 Ohmayer .............. F16D 55/224 188/106 F
3,651,896 A * 3/1972 Fannin .................... F16D 65/54 188/170
4,540,066 A * 9/1985 Evans ..................... F16D 65/18 188/71.9
4,766,981 A * 8/1988 Harrison .................. B61H 5/00 188/73.34
6,412,612 B1 * 7/2002 Parsons ................... F16D 55/32 188/170
7,455,152 B2 * 11/2008 Wang .................... F16D 55/225 188/106 P
9,889,833 B2 * 2/2018 Burgoon ................. F16D 65/18
10,393,245 B2 8/2019 Pasquet et al.
2009/0229933 A1 * 9/2009 Wang .................... F16D 65/092 188/250 H
2010/0072811 A1 * 3/2010 Kondo .................. B60T 13/741 303/20
2011/0042171 A1 * 2/2011 Knechtges ............ B60T 13/745 188/106 F
2014/0110196 A1 4/2014 Burgoon et al.
2019/0389444 A1 * 12/2019 Kistner ................... B60T 13/74
2020/0256411 A1 * 8/2020 Willey .................. B60T 13/588
2024/0270223 A1 * 8/2024 Auguste ................ F16D 55/226

* cited by examiner

DISC BRAKE INCORPORATING AN ELECTROMECHANICAL PARKING BRAKE

CROSS-REFERENCE TO RELATED APPLICATIONS

This is the National Stage application of PCT international application PCT/FR2022/051089, filed on Jun. 8, 2022, which claims the priority of French Patent Application No. 2106325, filed Jun. 15, 2021, both of which are incorporated herein by reference in their entireties.

TECHNICAL FIELD AND PRIOR ART

The present invention relates to the field of disc brakes, in particular disc brakes with at least partly electrical actuation.

An example of a disc brake includes a carrier intended to be fixed to a steering knuckle of a motor vehicle, a calliper mounted floating relative to the carrier, two brake pads intended to come into contact with a brake disc fixed in rotation on a wheel. The calliper includes a piston which can be moved under the action of a pressurised fluid to apply one of the pads against one face of the brake disc. By reaction, the calliper slides and applies the other pad against the other face of the brake disc.

When the pressure is released, the piston moves back and allows the pad in contact therewith to move away from the brake disc, the braking force is cancelled. The other pad also moves away from the other face of the disc.

In the automotive industry, the function of parking braking is to immobilise the vehicle when stationary in order to prevent it from moving unexpectedly. It also meets the legal provision requiring a second braking system independent of the service braking system, which is generally hydraulic.

There are also disc brakes provided with a parking or electromechanical parking brake including a device which, under the action of an electric motor, allows the piston to be moved in order to apply the brake pads against the disc. The device is for example a worm and is housed in the piston. A button located in the passenger compartment allows activation of the parking brake. Braking during driving is obtained by hydraulic actuation.

It is desirable to have a disc brake wherein the pushing force of the piston on the brake pad is distributed in a more balanced manner.

Moreover, in applications to large and/or high-power vehicles, provision is made for using two-piston disc brakes, that is to say including two pistons which are actuated simultaneously to apply the pads against the disc. Such a disc brake allows to generate significant braking power.

This type of disc brake is for example used in utility vehicles such as vans or light trucks, cars called large-duty sport cars or in sports utility vehicles or SUV.

When it is desired to incorporate an electromechanical parking brake function with a two-piston disc brake, a motor and a force chain for each piston is required. However, the use of two motors increases the overall size of the brake as well as its mass. Furthermore, such incorporation is complex.

DESCRIPTION OF THE INVENTION

It is therefore a purpose of the present invention to offer a disc brake with at least two hydraulically actuatable pistons incorporating an electromechanical parking brake function without having the disadvantages stated above.

The purpose stated above is achieved by a disc brake including at least two pistons, a push member and an interface device between the push member and the brake pad.

The at least two pistons are hydraulically actuatable and the push member, which may or may not be a piston, is actuated by a gear motor, the element being arranged between the two hydraulically actuatable pistons. The interface device rests against the pad support, and includes a plate provided with two through-openings arranged so as to be traversed by the piston heads of the two hydraulically actuatable pistons, which come into contact with the pad support. The push member actuated by the electric motor is intended to bear against the plate in a central area thereof between the two through-openings.

The implementation of the interface plate between the central push member and the pad ensures a balanced and homogeneous distribution on the brake pad.

The actuation of the parking brake is advantageously obtained by two steps:

- Hydraulic actuation of the at least two pistons to apply the pad onto the disc.
- Actuation of the push member by power supplying the electric motor allowing to increase the force on the disc and lock the pad against the disc.
- Release of the hydraulic pressure in both pistons.

The application of the brake pad against the brake disc by the two pistons automatically ensures a balanced and homogeneous force distribution on the brake pad, and the maintenance of the pad against the disc by the push member via the central area of the interface plate ensures maintaining this balanced and homogeneous force.

In other words, a two-piston brake is produced which includes a central element which presses against the brake pad via a plate which ensures balanced and homogeneous repair of the pressing force on the brake pad.

The invention is simple to be implemented and does not require modification of the brake for its incorporation. Furthermore, it allows to use electromechanical parking brake actuators already used in single-piston disc brakes.

In an exemplary embodiment, the push member is a piston, which is also hydraulically actuatable.

Advantageously, the interface device is guided by the carrier.

The present invention relates to a disc brake comprising a carrier, at least one first brake pad mounted in a sliding manner in the carrier, said first brake pad comprising a pad support and a friction material, a calliper including means for moving said first pad comprising at least a first piston and a second piston mounted in a sliding manner in the calliper and hydraulically actuatable, so as to move the first brake pad relative to the carrier. The brake also includes at least one push member mounted in a sliding manner in the calliper and which can be actuated at least by an actuator configured to move the push member axially, said push member being arranged between the first piston and the second piston considering a transverse direction. The brake also includes an interface device arranged between the push member and the pad support, said interface device comprising an interface plate comprising a first through-opening aligned with the first piston and traversed by the piston head of the first piston and a second through-opening, aligned with the second piston and traversed by the piston head of the second piston, so as to come into contact with the pad support, and the head of said push member is intended to come into contact with the interface plate between the first and second openings.

Advantageously, the interface plate of the interface device is guided axially by the carrier.

Preferably, the dimensions of the first and second openings are such that the first and second pistons slide freely in the first and second openings respectively.

The plate is advantageously made of hard steel.

In an exemplary embodiment, the push member is hydraulically actuatable.

In one example, the brake may include a second brake pad and wherein the calliper is mounted in a sliding manner relative to the carrier.

The invention also relates to an interface device for a disc brake, said disc brake including at least two hydraulically actuatable pistons and a push member which can be actuated at least electrically, said device comprising an interface plate configured to be housed between the pad support and means for moving said pad towards the brake disc, said interface plate including two openings for the passages of said two hydraulically actuatable pistons and a solid central area.

The interface device is advantageously configured to be guided at least axially by the carrier of the disc brake.

Advantageously, the interface plate is made of hard steel.

Another object of the present application is a method for actuating a disc brake according to the invention, following an instruction to activate the parking brake, including:

a) Moving the first and second pistons by applying hydraulic pressure so as to come into direct contact with the pad support through the interface plate and to apply the friction material of the brake pad against the brake disc.
b) Maintaining hydraulic pressure.
c) Moving the push member by means of said actuator so as to bear against the interface plate and to further apply the friction material of the brake pad against the brake disc through the interface plate.
d) Blocking the push member in position.
e) Releasing hydraulic pressure.

In an exemplary embodiment, during step a) the push member is moved by application of hydraulic pressure.

Following an instruction to deactivate the parking brake, the actuation method may include:

Moving the first and second pistons by application of hydraulic pressure so as to exert additional force on the friction material of the brake pad against the brake disc.

Maintaining hydraulic pressure.

Moving the push member, by means of said actuator, away from the interface plate.

Releasing hydraulic pressure.

BRIEF DESCRIPTION OF THE DRAWINGS

The present invention will be better understood on the basis of the description which follows and the appended drawings wherein.

DETAILED DESCRIPTION OF PARTICULAR EMBODIMENTS

The axial direction is parallel to the disc axis and the transverse direction is orthogonal to the disc axis.

The upstream and downstream direction is considered in the direction of axial movement of the piston during braking.

Figure 2:
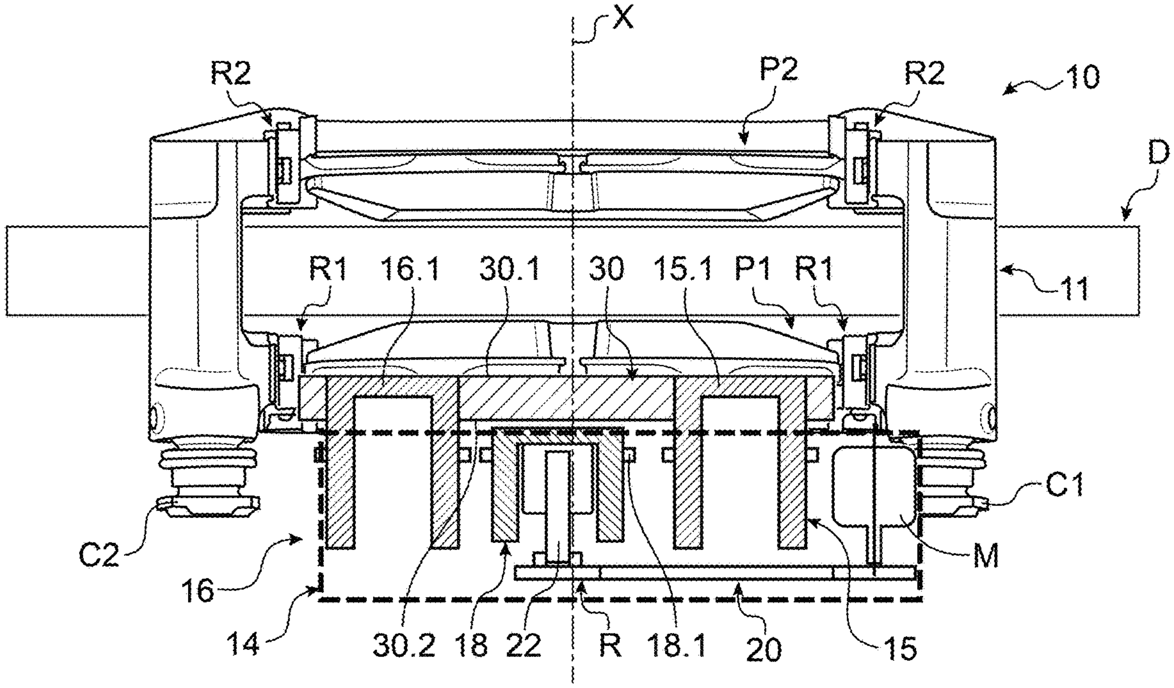
FIG. 2 is a schematic representation of a top view of the brake of FIG. 1, the calliper being omitted.
Figure 3A:
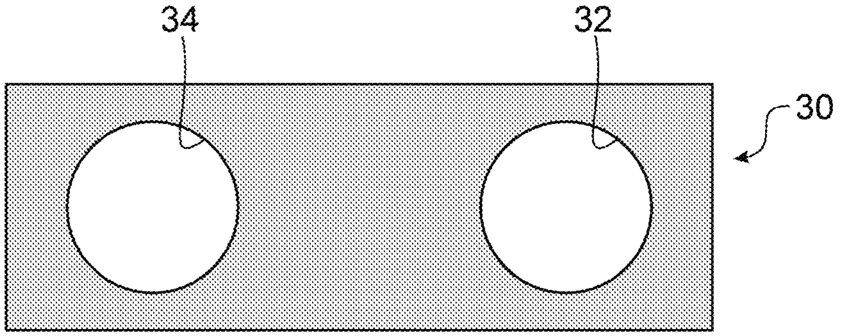
FIG. 3A is a front view of an example interface device according to the invention.
Figure 3B:
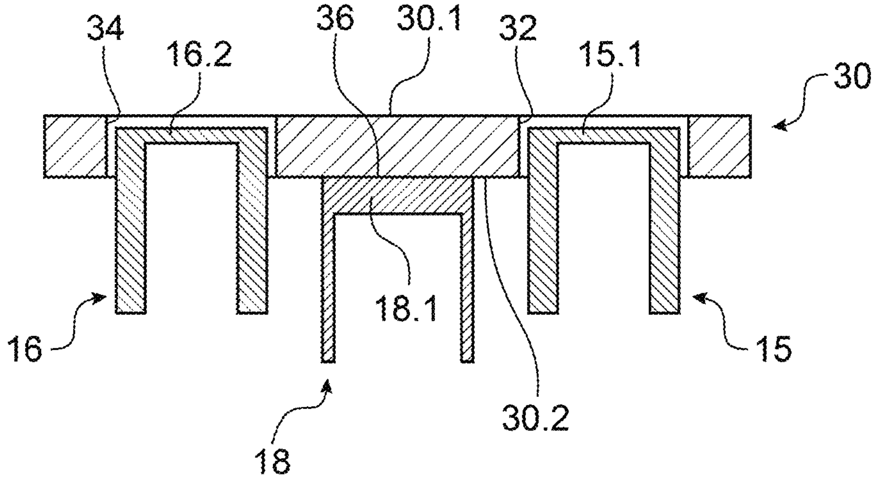
FIG. 3B is seen in cross section along plane A-A of the device of FIG. 3A, cooperating with the pistons.

The disc brake 10 includes a calliper 12 including a rear case 14 wherein a first brake piston 15 and a second brake piston 16 are mounted in a sliding manner axially along the axis X. The disc brake also includes a carrier 11 intended to be fixed on the steering knuckle of a wheel. The carrier 11 supports the brake shoes or brake pads P1 and P2 (FIG. 2). Each brake pad includes a pad support intended to be in contact with the head 15.1 and 16.1 of the first 15 and second 16 pistons respectively or with the calliper head and a brake lining intended to come into contact with the brake disc.

The disc brake includes two columns C1 and C2 allowing the calliper to slide relative to the carrier. One C2 of the columns allows to open the brake by pivoting the calliper around the other column C1 and to replace the brake pads.

The brake pads include lugs. The lugs extend laterally outwards and cooperate with grooves or slots carried by the carrier so as to ensure the axial guiding of the pads relative to the disc. In the example shown and advantageously, springs R1, R2 are mounted in the grooves and receive the lugs. The springs facilitate the sliding of the pads and can provide an axial guiding and return function, or even a clearance adjustment function.

In the example shown, the disc brake 10 also includes a parking brake module comprising for example a piston 18, designated third piston, arranged between the first 15 and the second 16 pistons and intended to move along the direction X also.

The pistons 15, 16 are mounted in a sliding manner in a calliper case which is connected to a hydraulic brake fluid circuit. The parking brake module includes a gear motor group or electromechanical actuator 20 mounted in the case. The gear motor group comprises an electric motor M and a reduction mechanism R (represented schematically). Furthermore, the actuator includes means for transforming the rotational movement of the motor shaft into axial movement of the piston, these means are self-locking. In the example shown, these means are of the irreversible screw-nut type. For example, a threaded axle 22 rotated by the actuator is screwed into a socket which carries a blocking crown (not shown) in rotation of this socket relative to the third piston 18 on the side opposite the head 18.1 of the third piston 18.

Rotation of the threaded axle in one direction causes axial movement of the third piston towards the inner pad and rotation of the threaded axle in the opposite direction causes axial movement of the third piston away from the inner pad.

The gear motor is for example close or similar to the gear motor described in document FR3024516.

In the example shown, the calliper 12 is of the sliding type. The calliper includes a calliper head 24 connected to the case 14 (shown in dotted lines in FIG. 2) by an arch 26 is intended to overlap the brake disc D (shown in dotted lines in FIG. 2). The head 24 is located axially downstream of the outer pad considering the direction of movement of the inner pad P1. The head 24 is intended to exert a pushing force on the outer pad P2 towards the disc in the following manner.

The inner pad P1 is moved by the pistons 15 and 16 to come into contact with one face of the disc and the outer pad P2 is moved towards the other face of the disc by movement of the calliper by reaction, due to the contact between the inner pad and the brake disc.

In this example, the dimensions of the disc D intended to be braked by the disc brake, of the brake pads P1, P2, of the carrier 11 supporting the pads and at least of the arch 26 and the calliper head 24 are those of a two-piston disc brake, that is to say a disc brake including a case wherein two pistons intended to bear against the inner pad are usually mounted.

The disc brake also includes an interface device intended to ensure the application of a braking force in parking brake function which is balanced and homogeneous over the entire surface of the inner pad.

The interface device includes a plate 30 intended to be arranged upstream of the inner pad between the first 15, second 16 and third 18 pistons.

The plate 30 has a shape and exterior dimensions close to or similar to those of the inner pad support so as to bear on a large surface thereof.

Advantageously, the plate 30 is guided by the carrier, in particular its radial ends are mounted in the slots of the carrier. Advantageously, the interface plate 30 participates in the axial guidance of the brake pad P1.

The plate 30 includes a downstream face 30.1 intended to come into contact with the rear face of the inner pad support and an upstream face 30.2 oriented towards the pistons.

The plate 30 can be driven radially by the brake pad due to its radial movement under the effect of the braking torque exerted by the brake disc during braking.

The plate 30 includes a first through-opening 32 and a second through-opening 34 arranged on the plate 30 so that, when mounted in the carrier, the first opening 32 is aligned with the first piston 15 and the second opening is aligned with the second piston 16. Furthermore, the first opening 32 and the second opening 34 are dimensioned to allow the passage of the pistons with clearance through the openings 32, 34. The clearance between the outer lateral surface of the piston and the inner lateral surface is at least equal to the radial movement of the inner brake pad in order to avoid jamming of the pistons in the openings. In the example shown, the pistons 15, 16 have a circular section and the openings also have a circular section. The dimensions of the openings can be significantly larger than the transverse dimensions of the pistons.

The plate 30 includes between the two openings a central area 36 against which the head 18.1 of the third piston 18 is intended to come into contact. This central area 36 is solid, the head 18.1 of the third piston does not come into contact with the brake pad support and exerts the pushing force on the brake pad via the plate 30. The central area 36 of the plate 30 is substantially aligned with the central area of the inner pad support. Advantageously, the support of the third piston 18 on the central area of the interface plate is a ball joint connection.

The interface plate is made of a rigid material so as not to flex and to allow homogenous distribution of the force exerted by the third piston. For example, the plate 30 is made of hard steel, advantageously from the same material as that of the inner brake pad support.

The piston 18, when it is moved only by the actuator 20, can be replaced by any element capable of exerting a pushing force on the interface plate 30, for example it can be a nut or a screw depending on the configuration of the actuator.

Figure 1:
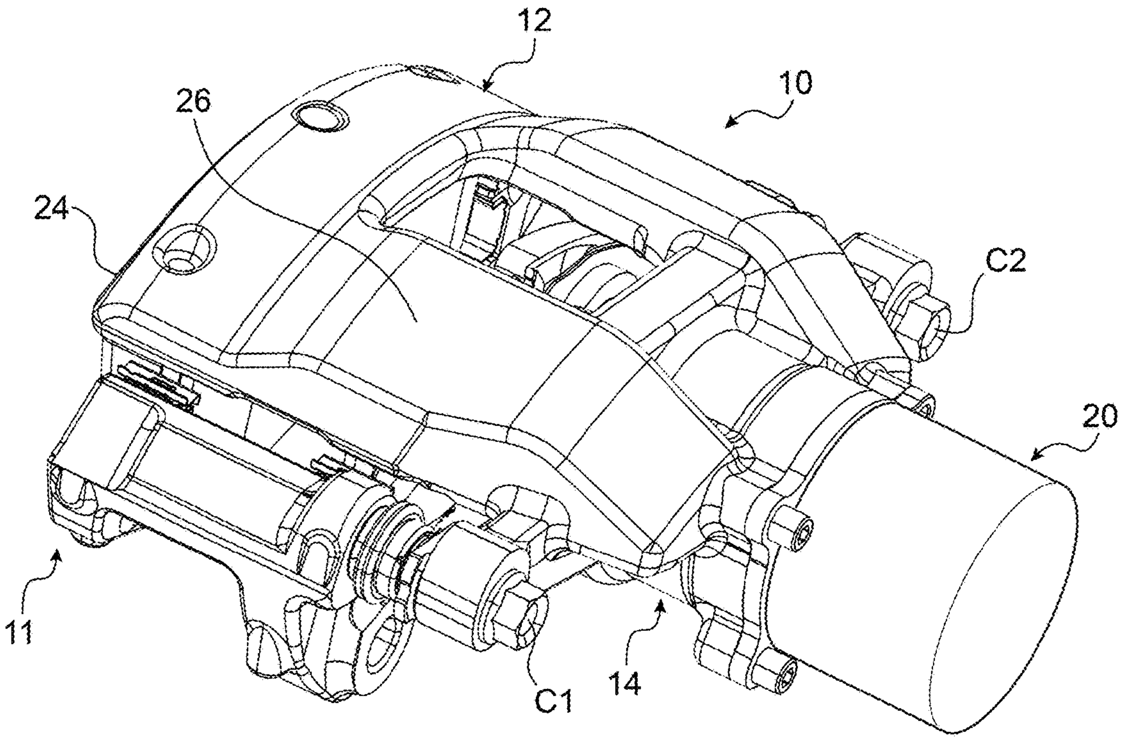
FIG. 1 is a perspective view of an example of a disc brake according to the invention.

The operation of the disc brake of FIG. 1 will now be described in relation to FIGS. 4A to 4D. In FIGS. 4A to 4D, only the inner brake pad, the pistons and the gear motor are shown, the carrier, the calliper and the outer brake pad were omitted.

Figure 4A:
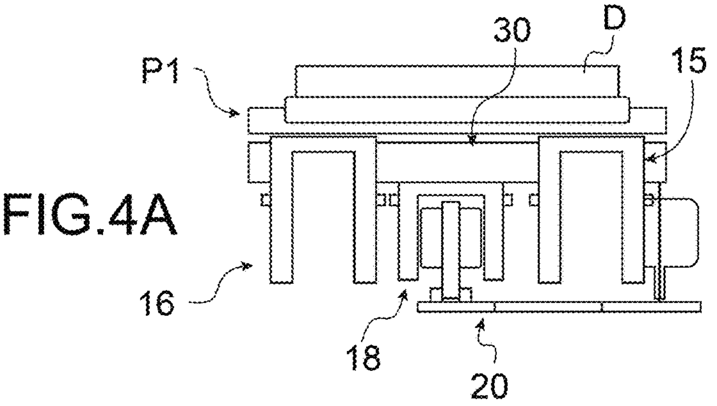
FIG. 4A, FIG. 4B, FIG. 4C, FIG. 4D are schematic representations of the different configurations of the brake of FIG. 1 during an activation phase of the parking brake.

In FIG. 4A, the disc brake is at rest. The outer pad lining is spaced from the brake disc.

Figure 4B:
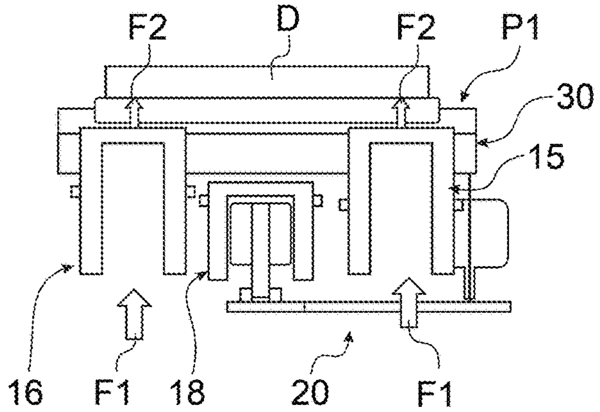

To apply the parking brake, for example, the driver presses a button located on the dashboard. During a first phase the first 15 and second 16 pistons are moved under the action of a pressurised hydraulic fluid, the piston heads 15.1, 16.1 which pass through the plate 30, bear against the inner pad support, which has the effect of moving the inner pad towards the disc and applying the lining against the brake disc. The sliding of the pistons is shown schematically by the arrows F1. The sliding of the pistons 15, 16 through the plate 30 is done without contact therewith. The pressurised fluid is for example delivered by a pump. Hydraulic pressure is maintained. The force applied by the first and second 16 pistons on the pad against the brake disc is symbolised by the arrows F2 (FIG. 4B). By reaction, the brake calliper slides relative to the carrier and applies the outer brake pad against the other face of the brake disc.

Figure 4C:
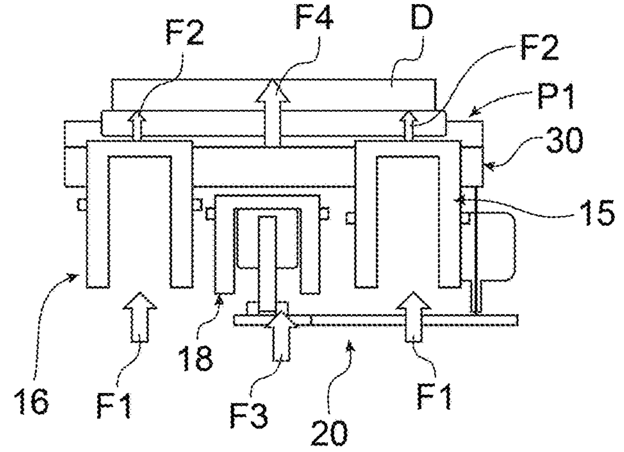
Figure 4D:
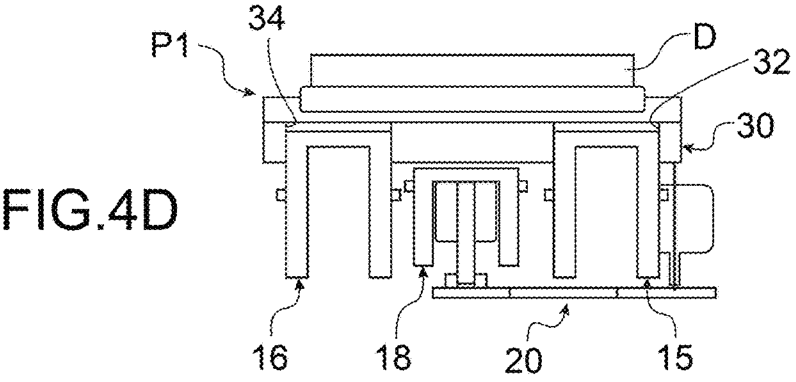

During a second phase, the gear motor is activated, causing the third piston 18 to move towards the plate 30. The head 18.1 of the third piston 18 comes into contact with the central area 32 of the plate 30 and applies an additional force to the brake pad in the direction of the disc through the plate 30. The sliding of the third piston 18 is symbolised by the arrow F3. The force applied by the third piston 18 to the brake pad against the disc is symbolised by the arrow F4. The gear motor is deactivated when a predetermined force is reached. The third piston 18 blocks the inner pad on the disc in a tight position (FIG. 4C).

During a third phase the hydraulic pressure is released (FIG. 4D) and the pistons 15 and 16 return to their rest position.

The force applied to the inner brake pad in the parking brake position is distributed in a balanced and homogeneous manner thanks to the use of the plate 30.

By using the hydraulic pistons in a first phase, the balanced and homogeneous application of the force of the pad on the disc is advantageously ensured.

By using a rigid plate 30 and an electromechanical actuator which presses against the central area of the brake pad, the pad is blocked in position and the application is maintained balanced and uniform.

The outer pad is applied against the other face of the brake disc almost simultaneously due to the sliding of the calliper relative to the carrier.

However, it is understood that the application of the parking brake only with the gear motor does not go beyond the scope of the present invention.

The activation of the parking brake can also be automatic. For example and without limitation, if the on-board computer detects that the engine is off and the vehicle is parked on a slope.

Advantageously, to interrupt the parking braking, the first and second pistons are applied against the brake pad, and then the gear motor is activated in the opposite direction to move the third piston away from the plate 30. This mode of operation facilitates the removal of the third piston.

The service braking is provided by the first and second pistons.

Advantageously, the third piston can provide emergency braking in the event of failure of the hydraulic system. The third piston alone may be capable of applying a force of around 28 kN. The value of this force depends on the actuator used.

In another embodiment, the third piston is also an electro-hydraulic piston, that is to say it can be actuated both electrically and hydraulically. A supply of braking fluid is then provided to supply a chamber wherein the third piston slides. Advantageously, the screw-nut connection is bathed in the brake fluid ensuring its lubrication. The third piston is then also moved during the first phase. During the second phase it exerts an additional force on the inner brake pad under the action of the gear motor and is blocked in position. Hydraulic pressure is then released for all three pistons.

The service braking is provided by the first and second pistons or by the first, second and third pistons.

Advantageously, the third piston with its parking brake mechanism can provide emergency braking in the event of failure of the hydraulic system.

For comparison purposes only, a disc brake according to the invention including a first and a second piston of diameter 36 mm and a third piston of diameter 36 mm is equivalent to a two-piston brake including two pistons of diameter 44 mm each.

A disc brake according to the invention including a first and a second piston of diameter 34 mm and a third piston of diameter 48 mm is equivalent to a two-piston brake including two pistons of diameter 48 mm each.

A disc brake according to the invention including a first and a second piston of diameter 36 mm and a third piston of diameter 51 mm is equivalent to a two-piston brake including two pistons of diameter 51 mm each.

The invention allows to use pistons moved only by hydraulic pressure of reduced diameter compared to those of two-piston brakes, which allows to reduce the amount of brake fluid required for their movement. It will be understood that the present invention also applies to a fixed calliper disc brake, that is to say including sets of pistons and two push members to move each pad separately.

The disc brake according to the invention is particularly adapted for heavy vehicles called large-duty sport cars, sports utility vehicles or SUV and light utility vehicles designated "light trucks", in particular with a total mass with load greater than or equal to 3.5 T.

REFERENCES

10 disc brake
12 calliper
11 carrier
14 case
15 first piston
15.1 head of the first piston
16 second piston
16.1 head of the second piston
18 third piston
18.1 head of the second piston
20 electromechanical actuator
22 screw
24 calliper head
26 arch
30 interface plate
30.1 downstream face
30.2 upstream face
32 first opening
34 second opening
36 central area
C1 first column
C2 second column
P1 first brake pad
P2 second brake pad
R1, R2 springs
X calliper sliding direction

What is claimed is:

1. A disc brake including:

at least one first brake pad mounted in a sliding manner relative to the disc, said first brake pad comprising a pad support and a friction material, a calliper including:

means for moving said first pad comprising at least a first piston and a second piston mounted in a sliding manner in the calliper and hydraulically actuatable, so as to move the first brake pad relative to the disc, wherein the disc brake further includes at least one push member mounted in a sliding manner in the calliper and adapted to be actuated at least by an actuator configured to move the push member axially, said push member being arranged between the first piston and the second piston considering a transverse direction, wherein the disc brake further includes an interface device arranged between the push member and the pad support, said interface device including:

an interface plate comprising a first through-opening aligned with the first piston and traversed by a piston head of the first piston and a second through-opening aligned with the second piston and traversed by a piston head of the second piston, so as to come into contact with the pad support, and wherein a head of said push member is intended to come into contact with the interface plate between the first and second openings, and wherein the dimensions of the first and second openings are such that the first and second pistons slide freely with clearance through the first and second openings respectively.

2. The disc brake according to claim 1, wherein the interface plate of the interface device is guided axially relative to a carrier of the disc brake with a floating calliper.

3. The disc brake according to claim 1, wherein the interface plate is made of hard steel, and/or wherein the interface plate is made of the same material as the material of the pad support.

4. The disc brake according to claim 1, wherein the push member is hydraulically actuatable and/or wherein the push member is actuatable by an electromechanical actuator.

5. The disc brake according to claim 1, including a carrier, and a second brake pad, and wherein the calliper is mounted in a sliding manner relative to the carrier.

6. The disc brake according to claim 1, including a calliper case and a second brake pad, the disc brake being a fixed calliper disc brake.

7. The disc brake according to claim 1, the disc brake implementing a method for actuating the brake, following an instruction to activate a parking brake, including:

a) Moving the first and second pistons by applying hydraulic pressure so as to come into direct contact with the pad support through the interface plate and to apply the friction material of the brake pad against the brake disc, b) Maintaining hydraulic pressure, c) Moving the push member by means of said actuator so as to bear against the interface plate and to further apply the friction material of the brake pad against the brake disc through the interface plate, d) Blocking the push member in position, e) Releasing hydraulic pressure.

8. The method according to claim 7, wherein the push member is moved by application of hydraulic pressure and/or electromechanical force, wherein, during step a) of the brake actuation method, the push member is moved by application of hydraulic pressure.

9. The disc brake according to claim 7, wherein the actuation method includes, following an instruction to deactivate the parking brake:

Moving the first and second pistons by application of hydraulic pressure so as to exert additional force on the friction material of the brake pad against the brake disc, Maintaining hydraulic pressure, Moving the push member, by means of said actuator, away from the interface plate, Releasing hydraulic pressure.

10. An interface device for a disc brake, said disc brake including at least two hydraulically actuatable pistons and a push member which is adapted to be actuated at least electrically, said device comprising an interface plate configured to be housed between a pad support and means for moving said pad towards the brake disc, said interface plate including two openings for the passages of said two hydraulically actuatable pistons and a solid central area, wherein the dimensions of the two openings are such that the hydraulically actuatable pistons slide freely with clearance through the two openings.

11. The interface device for a disc brake, according to claim 10, configured to be guided at least axially relative to the disc, in particular by a carrier when the disc brake is the disc brake with a floating calliper.

12. The interface device for a disc brake according to claim 10, wherein the interface plate is made of hard steel.

* * * * *